US008352149B2

(12) United States Patent
Meacham

(10) Patent No.: US 8,352,149 B2
(45) Date of Patent: Jan. 8, 2013

(54) SYSTEM AND METHOD FOR PROVIDING GAS TURBINE ENGINE OUTPUT TORQUE SENSOR VALIDATION AND SENSOR BACKUP USING A SPEED SENSOR

(75) Inventor: Walter L. Meacham, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1043 days.

(21) Appl. No.: 12/244,566

(22) Filed: Oct. 2, 2008

(65) Prior Publication Data

US 2010/0088003 A1 Apr. 8, 2010

(51) Int. Cl.
*G06F 19/00* (2006.01)
*G06G 7/70* (2006.01)

(52) U.S. Cl. ........................ 701/100; 702/33; 73/862.08

(58) Field of Classification Search .................. 701/100; 477/30; 416/30–31; 62/115–116; 702/41–43, 702/182–185, 34–35, 33; 73/862.321, 114.13, 73/114.15, 862.08
See application file for complete search history.

(56) References Cited

U.S. PATENT DOCUMENTS 3,548,649 A 12/1970 Parkinson
3,599,492 A 8/1971 Kalmus et al.
3,729,928 A * 5/1973 Rowen ........................ 60/39.281
3,921,446 A 11/1975 Ludloff
4,169,371 A 10/1979 Witschi et al.
4,468,972 A 9/1984 Fisher et al.
4,501,138 A 2/1985 McCandless
4,517,648 A 5/1985 Ina et al.
4,522,026 A 6/1985 Peterson et al.
4,576,062 A * 3/1986 Reppert et al. .................. 477/30
4,682,505 A 7/1987 Morissette et al.
4,758,967 A 7/1988 Shmuter et al.
4,947,970 A * 8/1990 Miller et al. .................... 477/30
5,001,937 A 3/1991 Bechtel et al.

(Continued)

FOREIGN PATENT DOCUMENTS

EP 1802865 A1 * 7/2007

(Continued)

OTHER PUBLICATIONS

Shutler, Control configuration design for the aircraft gas turbine engine, 1995, Internet. p. 22-28.*

(Continued)

*Primary Examiner* — Cuong H Nguyen
(74) *Attorney, Agent, or Firm* — Ingrassia Fisher & Lorenz, P.C.

(57) ABSTRACT

Methods and apparatus are provided for verifying proper operation of a gas turbine engine output torque sensor using a speed sensor, and using the speed sensor as a backup torque sensor. Gas turbine engine output torque is sensed using a reference torque sensor, and gas turbine engine output shaft rotational speed is sensed. Gas turbine engine output torque is calculated from the sensed gas turbine engine output shaft rotational speed. The sensed gas turbine engine output torque is compared to the calculated gas turbine engine output torque to determine if the reference torque sensor is operating properly. The gas turbine engine is controlled at least partially based on the sensed gas turbine engine output torque if the reference torque sensor is determined to be operating properly, and is controlled at least partially based on the calculated output torque if the reference torque sensor is determined to be not operating properly.

20 Claims, 3 Drawing Sheets

U.S. PATENT DOCUMENTS

| | | | | |
|---|---|---|---|---|
| 5,389,780 | A | 2/1995 | Anderson | |
| 5,485,757 | A * | 1/1996 | Foxwell | 73/862.321 |
| 5,508,609 | A | 4/1996 | Parkinson et al. | |
| 5,523,561 | A | 6/1996 | Ironside et al. | |
| 6,247,445 | B1 | 6/2001 | Langer | |
| 6,251,044 | B1 | 6/2001 | Streib | |
| 6,285,024 | B1 | 9/2001 | Pinnock | |
| 6,332,352 | B1 * | 12/2001 | Sano | 73/114.15 |
| 6,389,910 | B1 | 5/2002 | Eisenhauer | |
| 6,560,549 | B2 * | 5/2003 | Fonkalsrud et al. | 702/41 |
| 6,604,412 | B2 | 8/2003 | Jankovic et al. | |
| 6,759,648 | B2 | 7/2004 | Baxter et al. | |
| 6,761,075 | B2 | 7/2004 | Steinlechner et al. | |
| 6,817,528 | B2 | 11/2004 | Chen | |
| 6,852,066 | B2 | 2/2005 | Senger et al. | |
| 6,946,650 | B2 | 9/2005 | Yoerger et al. | |
| 6,964,192 | B2 | 11/2005 | Bauer et al. | |
| 7,112,904 | B2 | 9/2006 | Akiyama | |
| 7,194,997 | B2 | 3/2007 | Pitzal et al. | |
| 7,237,444 | B2 | 7/2007 | Berdichevsky et al. | |
| 7,292,325 | B2 | 11/2007 | Lee | |
| 7,389,682 | B2 | 6/2008 | JaVaherian | |
| 7,571,045 | B2 * | 8/2009 | Muramatsu et al. | 701/100 |
| 7,757,570 | B1 | 7/2010 | Marin et al. | |
| 7,832,289 | B2 * | 11/2010 | Garshelis et al. | 73/862.333 |
| 8,073,653 | B2 * | 12/2011 | Suzuki et al. | 702/181 |
| 2005/0267667 | A1 * | 12/2005 | Muramatsu et al. | 701/100 |
| 2006/0087123 | A1 * | 4/2006 | Stout et al. | 290/2 |
| 2008/0079262 | A1 * | 4/2008 | McGinley et al. | 290/31 |
| 2010/0088003 | A1 * | 4/2010 | Meacham | 701/100 |

FOREIGN PATENT DOCUMENTS

| | | | |
|---|---|---|---|
| EP | 1906008 | A2 * | 4/2008 |
| JP | 01187346 | A * | 7/1989 |
| JP | 11020728 | A * | 1/1999 |
| WO | WO 2006047257 | A1 * | 5/2006 |

OTHER PUBLICATIONS

Brunell et al., Nonlinear Model Predictive Control of an Aircraft Gas Turbine Engine, 2002, IEEE, p. 4649-4651.*

Gorinevsky et al., Model-Based Diagnostics for an Aircraft Auxiliary Power Unit, 2002, Internet, IEEE, p. 1-6.*

Herbst et al. "Model calculations of torque-induced axial magnetization in circumferentially magnetized rings: Small angle approximation," J. Magn. & Magn. Mat. 176(2-3):183-196, Feb. 1997.*

Mitigation of wind power fluctuations in smart grids; de Haan, J.E.S.; Frunt, J.; Kling, W.L.; Innovative Smart Grid Technologies Conference Europe (ISGT Europe), 2010 IEEE PES; Digital Object Identifier: 10.1109/ISGTEUROPE.2010.5638904 Publication Year: 2010 , pp. 1-8.*

A static turbine flow meter with a micromachined silicon torque sensor; Svedin, N.; Stemme, E.; Stemme, G.; Microelectromechanical Systems, Journal of; vol. 12 , Issue: 6; Digital Object Identifier: 10.1109/JMEMS.2003.820271 Publication Year: 2003 , pp. 937-946.*

Development of Robust Starting System Using Sensorless Vector Drive for a Microturbine; Min-Sik Rho; Sam-Young Kim; Industrial Electronics, IEEE Transactions on; vol. 57 , Issue: 3; Digital Object Identifier: 10.1109/TIE.2009.2028356 Publication Year: 2010 , pp. 1063-1073.*

Multi-Power Port Gas Turbine Configurations for Solar Cogeneration Applications; Damsker, D.; Curto, P.A.; Power Apparatus and Systems, IEEE Transactions on; vol. PAS-101 , Issue: 8; Digital Object Identifier: 10.1109/TPAS.1982.317609 Publication Year: 1982 , pp. 2591-2596.*

Managing requirements uncertainty in engine control systems development; Nolan, A.J.; Abrahao, S.; Clements, P.; Pickard, A. Requirements Engineering Conference (RE), 2011 19th IEEE International; Digital Object Identifier: 10.1109/RE.2011.6051622 Publication Year: 2011 , pp. 259-264.*

Systems integration using evolutionary algorithms; Chipperfield, A.J.; Fleming, P.J.; Control '96, UKACC International Conference on (Conf. Publ. No. 427); vol. 1; Digital Object Identifier: 10.1049/cp:19960637; Publication Year: 1996 , pp. 705-710 vol. 1.*

T700 Training Guide, Jun. 1979, Published by General Electric Company Aircraft Engine Group, Technical Training Operation, Lynn, MASS 01910.

EP Search Report, EP 11153270.1-1236 dated Jun. 28, 2011.

EP Communication, EP 11153270.1-1236 dated Jul. 15, 2011.

USPTO U.S. Appl. No. 12/708,117; Notice of Allowance and Fee(s) Due dated Jan. 18, 2012.

* cited by examiner

SYSTEM AND METHOD FOR PROVIDING GAS TURBINE ENGINE OUTPUT TORQUE SENSOR VALIDATION AND SENSOR BACKUP USING A SPEED SENSOR

TECHNICAL FIELD

The present invention generally relates to gas turbine engines and, more particularly, to systems and methods for verifying the proper operation of a gas turbine engine output torque sensor using a speed sensor, and for using the speed sensor as a backup torque sensor.

BACKGROUND

Gas turbine engines may be used as the primary power source for various kinds of aircraft. The engines may also serve as auxiliary power sources that drive air compressors, hydraulic pumps, and industrial electrical power generators. Most gas turbine engines implement the same basic power generation scheme. That is, compressed air is mixed with fuel and burned to generate hot combustion gases. The expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Main propulsion engines typically use the power created by the rotating turbine disk to draw more air into the engine, and the high velocity combustion gas is passed out of the gas turbine aft end to create forward thrust. Other engines may use this power to turn one or more propellers, electrical generators, or other devices.

In many instances, gas turbine engines may be automatically controlled via an engine controller. The engine controller receives signals from various sensors within the engine, as well as from various pilot-manipulated controls. In response to these signals, the engine controller regulates the operation of the gas turbine engine. One typical sensor that is used is a torque sensor, which senses the output torque of the gas turbine engine and supplies a torque sensor signal to the engine controller.

Though unlikely, it is postulated that this torque sensor could become inaccurate, or otherwise inoperable, over time. If this were to occur, the engine controller may not properly control the gas turbine engine and may lead technicians to believe that various other gas turbine engine components are inoperable. This can lead to unnecessary and potentially costly engine down-times.

Hence, there is a need for a system and method that can validate whether or not the torque sensor is operating properly so that the likelihood of unnecessary and costly engine down-times can be reduced and/or eliminated altogether. The present invention addresses at least this need.

BRIEF SUMMARY

In one embodiment, and by way of example only, a gas turbine engine control system includes a gas turbine engine, a reference torque sensor, a speed sensor, and an engine control. The gas turbine engine includes an output shaft, and is adapted to receive fuel flow and, upon receipt thereof, to generate an output torque and supply the output torque via the output shaft. The reference torque sensor is operable to sense the output torque and supply a torque sensor signal representative thereof. The speed sensor is operable to sense a rotational speed of the output shaft and supply a speed sensor signal representative thereof. The engine control is operable to implement one or more control laws, based in part on the output torque and rotational speed of the output shaft. The engine control is coupled to receive the torque sensor signal and the speed sensor signal and is further operable to calculate the output torque from the sensed rotational speed of the output shaft, compare the sensed output torque to the calculated output torque to determine if the reference torque sensor is operating properly, use the sensed output torque in the one or more control laws if the reference torque sensor is determined to be operating properly, and use the calculated output torque in the one or more control laws if the reference torque sensor is determined to be not operating properly.

In another exemplary embodiment, a method of controlling a gas turbine engine includes sensing gas turbine engine output torque using a reference torque sensor, and sensing gas turbine engine output shaft rotational speed. Gas turbine engine output torque is calculated from the sensed gas turbine engine output shaft rotational speed. The sensed gas turbine engine output torque is compared to the calculated gas turbine engine output torque to determine if the reference torque sensor is operating properly. The gas turbine engine is controlled at least partially based on the sensed gas turbine engine output torque if the reference torque sensor is determined to be operating properly, and is controlled at least partially based on the calculated output torque if the reference torque sensor is determined to be not operating properly.

Furthermore, other desirable features and characteristics of the present invention will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although the invention is described in the context of a gas turbine engine, it could be implemented with other machines and in other environments.

Figure 1:
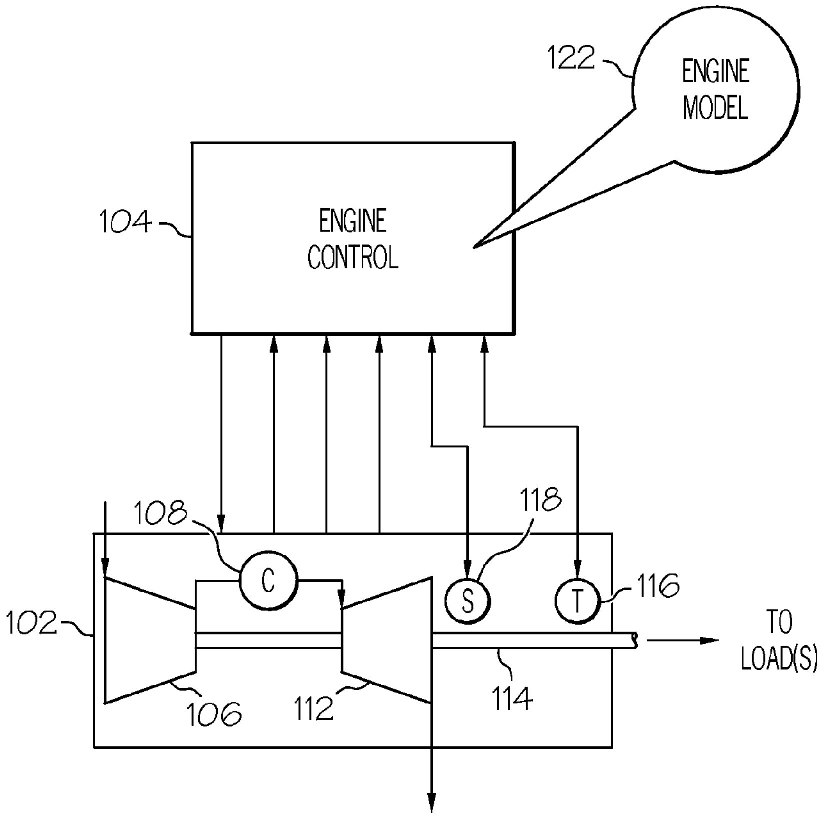
FIG. 1 is a functional block diagram of an exemplary gas turbine engine control system.

Referring now to FIG. 1, a functional block diagram of an exemplary gas turbine engine control system 100 is depicted. The system 100 includes a gas turbine engine 102 and an engine control 104. The depicted gas turbine engine includes a compressor 106, a combustor 108, and a turbine 112. The compressor 106 draws ambient air into the engine 102, compresses the air and thereby raises its pressure to a relatively high pressure, and directs the relatively high pressure air into the combustor 108. In the combustor 108, which includes a plurality of non-illustrated fuel injectors and one or more non-illustrated igniters, the relatively high pressure air is mixed with fuel and combusted. The combusted air is then directed into the turbine 112, where it expands and causes the turbine 112 to rotate. The air is then exhausted out the engine 102. As the turbine 112 rotates, it generates an output torque that drives one or more loads. In the depicted embodiment, the turbine 112 drives the compressor 106, and additionally drives one or more non-illustrated loads via an output shaft 114.

Before proceeding further, it is noted that the depicted gas turbine engine 102 is merely exemplary of any one of numerous types of gas turbine engines that may be used to implement the system and method encompassed by the claims. In this regard, although the gas turbine engine 102 is, for clarity and ease of illustration and description, depicted as a single spool gas turbine engine, it will be appreciated that the invention cold be used with various multi-spool engines, including various turbofan and turboshaft propulsion engines. In this same vein, the compressor 106, combustor 108, and turbine 112 may also each be variously implemented using any one of numerous suitable compressors, combustors, and turbines, now known or developed in the future. It will additionally be appreciated that the load(s) that is(are) driven by the output shaft 114 may be any one of numerous suitable loads. For example, the load(s) could be a watercraft propeller, an aircraft propeller, a rotorcraft rotor, a generator, or various combinations thereof, just to name a few.

No matter its specific implementation, the overall operation of the gas turbine engine 102 is controlled via the engine control 104. More specifically, the engine control 104, as is generally known, is used to control the output power of the engine 102 by, for example, controlling fuel flow rate to the engine 102, as well as controlling airflow through the engine 102. In the depicted embodiment, the engine control 104 receives signals from a plurality of sensors that are disposed at various locations on and within the engine 102. The sensors are used to sense various physical parameters associated with the engine 102 such as, for example, various temperatures, air pressures, air flow, engine speed, and engine torque, and supply signals representative of the sensed parameters to the engine control 104. The engine control 104 implements one or more control laws, based at least in part on these signals, and supplies various commands to the engine 102 to control its operation. It will be appreciated that the engine control 104 may be any one of numerous types of engine controllers such as, for example, a FADEC (Full Authority Digital Engine Controller) or an EEC (Electronic Engine Controller).

The sensors that supply the signals representative of the sensed parameters may vary in type and in number. In FIG. 1, only two sensors are explicitly depicted, and these sensors include a torque sensor 116 and a speed sensor 118. The torque sensor 116, which is referred to herein as the reference torque sensor 116 for reasons that will become apparent further below, is operable to sense the output torque and supply a torque signal representative thereof to the engine control 104. The speed sensor 118 is operable to sense the rotational speed of the output shaft 114 and supply a speed signal representative thereof to the engine control 104.

Figure 2:
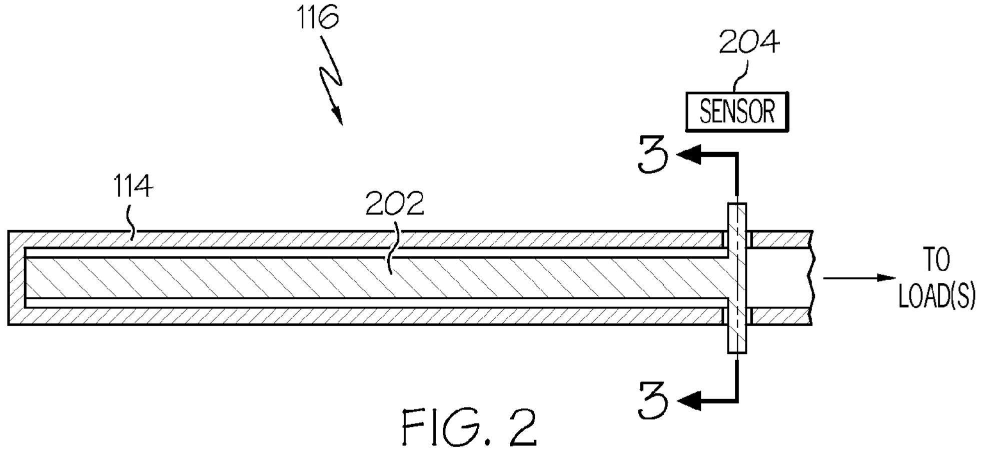
FIG. 2 is a simplified representation of an exemplary reference torque sensor that may be used in the system of FIG. 1.
Figure 3:
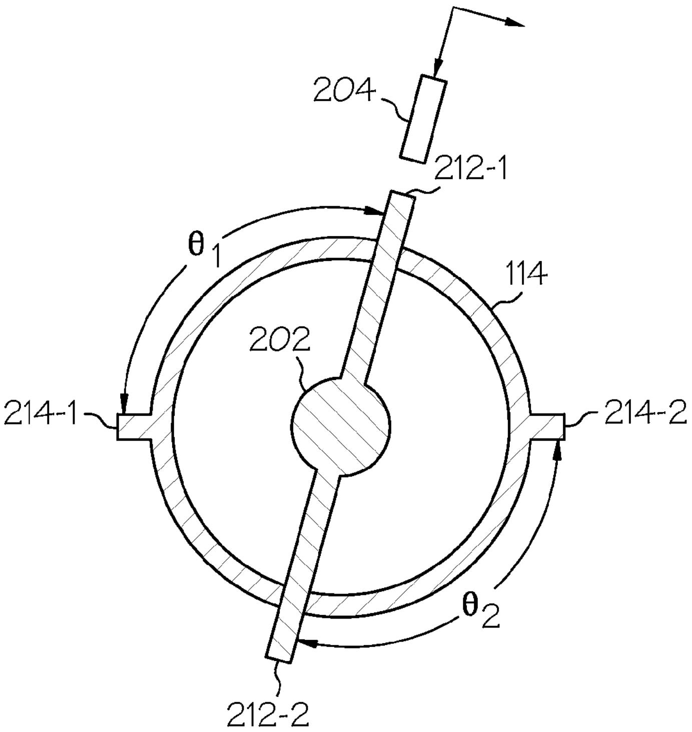
FIG. 3 is a cross section view of the sensor of FIG. 2, taken along ling 3-3 in FIG. 2.

The reference torque sensor 116 may be implemented using any one of numerous suitable torque sensing devices and may be implemented in any one of numerous configurations. In a particular embodiment, which is depicted in FIGS. 2 and 3, the reference torque sensor 116 includes a torque shaft 202 and a sensor 204. The torque shaft 202 is disposed within, and is thus surrounded by (or at least partially surrounded by) a portion of the output shaft 114, and includes a fixed end 206 and a free end 208. The torque shaft fixed end 206 is coupled to, and is thus rotated by, the output shaft 114.

As shown more clearly in FIG. 3, the torque shaft 202 and output shaft 114 each include a plurality of evenly spaced protrusions (e.g., teeth, blades, etc.) that extend radially outwardly. In the depicted embodiment, the torque shaft 202 includes two protrusions, a first protrusion 212-1 and a second protrusion 212-2, that are spaced 180-degrees apart. The output shaft 114 similarly includes two protrusions, a third protrusion 214-1 and a fourth protrusion 214-2, that are also spaced 180-degrees apart. Moreover, the first and third protrusions 212-1, 214-1 are offset by a predetermined first angle ($\theta_1$), and the second and fourth protrusions 212-2, 214-2 are offset by a predetermined second angle ($\theta_2$). Although the first and second predetermined angles may vary, in a particular embodiment the angles are equal, and are each 100-degrees. It may thus be appreciated that in this particular embodiment, the first and fourth protrusions 212-1, 214-2, and the second and third protrusions 212-2, 214-1, are offset by 80-degrees.

With continued reference to FIG. 3, it is seen that the sensor 204 is disposed in proximity to the output shaft 114. The sensor 202 is configured to sense rotations of the torque shaft 202 and the output shaft 114 and supply a signal representative thereof as the torque sensor signal. The sensor 204 may be variously configured to implement its functionality, but in the depicted embodiment it is configured as a pick-up device that generates and supplies an output voltage having an amplitude that varies based on the proximity of the protrusions 212-1, 212-2, 214-1, 214-2 to the sensor 204. Any one of numerous suitable pick-up devices may be used to implement the sensor 204 including, for example, any one of numerous monopole pick-up devices, any one of numerous eddy current sensors, any one of numerous Hall effect sensors, and any one of numerous optical sensors.

No matter the particular type of device that is used to implement the sensor 204, when a torque is supplied from the turbine 112 to the output shaft 114, the output shaft twists. However, because the torque shaft 202 is free at one end (e.g., the free end 208), it does not twist. As a result, whenever the output shaft 114 experiences a torque, the angle between the torque shaft protrusions 212-1, 212-2 and the output shaft protrusions 214-1, 214-2 will vary. The torque sensor signal supplied by the sensor 204 is representative of the variation in angle, which is representative of the twist in the output shaft 114. The relationship of output shaft twist and torque is used to determine the output torque of the gas turbine engine 102. It may be appreciated that the actual determination of output torque may be made in the engine control 104, or in separate circuitry that forms part of the reference torque sensor 116. It may additionally be appreciated that the reference torque sensor 116 may be alternatively implemented using, for example, a mango-resistive torque measurement system.

Figure 4:
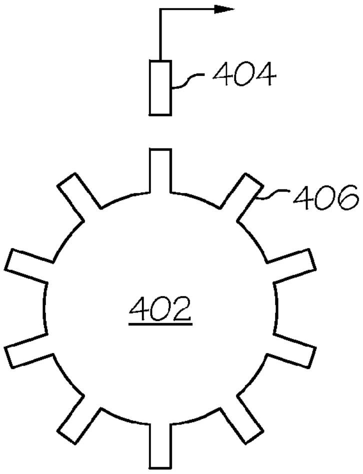
FIG. 4 depicts a simplified representation of an exemplary speed sensor that may be used in the system of FIG. 1.

Turning now to FIG. 4, a simplified cross section view of an exemplary embodiment of the speed sensor 118 is depicted. Although the speed sensor 118 may be variously implemented and configured, in the depicted embodiment it includes a sensor wheel 402 and a pick-up device 404. The sensor wheel 402 may be formed on, or otherwise mounted to, the output shaft 114, or it may be coupled to the output shaft 114 via one or more gears. In any case, the sensor wheel 402 includes a plurality of evenly spaced teeth 406. In the depicted embodiment, the sensor wheel 402 includes 10 teeth, though this number may be varied.

The pick-up device 404 is disposed adjacent the sensor wheel 402 and generates and supplies an output voltage having an amplitude that varies based on the proximity each tooth 406 to the pick-up device 404. Any one of numerous suitable devices may be used to implement the pick-up device 404 including, for example, any one of numerous monopole pick-up devices, any one of numerous eddy current sensors, any one of numerous Hall effect sensors, and any one of numerous optical sensors. In any case, the variations in output voltage amplitude supplied by the pick-up device 404 are representative of the rotational speed of the output shaft 114. It may be appreciated that the output voltage generated and supplied by the pick-up device may be the speed sensor signal that is supplied to the engine control 104. Alternatively, separate circuitry that forms part of the speed sensor 118 may determine shaft rotational speed and supply a separate signal to the engine control 104 as the speed sensor signal. Moreover, multiple speed sensors 118 may be included, and the speed of various other components and/or subsystems of the gas turbine engine 102 may be sensed, not just the output shaft 114.

Returning once again to FIG. 1, it was previously noted that engine control 104 implements one or more control laws, based at least in part on the signals it receives, and supplies various commands to the engine 102 to control its operation. The output torque of the engine 102 is one of the parameters used by the one or more control laws to generate and supply the commands to the engine 102 is output torque. Preferably, the torque sensor signal supplied by the reference torque sensor 116 is used in the one or more control laws. If, however, it is determined that the reference torque sensor 116 is not operating properly, an alternative measure of the output torque is used in the one or more control laws. In particular, and as will now be described, an output torque calculated from the sensed rotational speed is used.

As is generally known, the torque ($\tau$) of a rotating body can be calculated from Equation 1, as follows:

$$\tau = I\alpha, \qquad \text{(Eq. 1)}$$

where I is the rotational inertia and $\alpha$ is the rotational acceleration. Hence, if the rotational inertia and the rotational acceleration of the turbine 112 are known, then the output torque of the turbine 112 can be calculated. In the depicted embodiment, the rotational inertia of the turbine 112 is a predetermined value that is known and is stored, for example, in non-illustrated memory in the engine control 104. The rotational acceleration of the turbine 112 may be measured directly; however, in the depicted embodiment it is calculated from the sensed rotational speed of the output shaft 114. That is, by differentiating the sensed rotational speed. Because differentiation of the rotational speed signal may introduce noise, in some embodiments the rotational speed signal may be filtered prior to differentiation. Before proceeding, it may be appreciated that this speed-based torque calculation is representative of torque variations, and not the absolute torque. Hence, a baseline torque value from, for example, the reference torque sensor 116 may be used to convert calculated torque variations to absolute torque.

Before proceeding further, it is noted that that power is equal to the product of torque and angular velocity (i.e. $P=\tau\omega$), and that the time rate of change of the square of angular velocity is proportional to power divided by moment of inertia (i.e., $d(\omega^2)/dt=2P/I$). Accordingly, it should be understood that angular acceleration, or power, or the time rate of change of the square of angular velocity may be used to calculate torque. As was previously noted, multiple speed sensors 118 may be used to sense torque from various engine subsystems to determine total torque.

Figure 5:
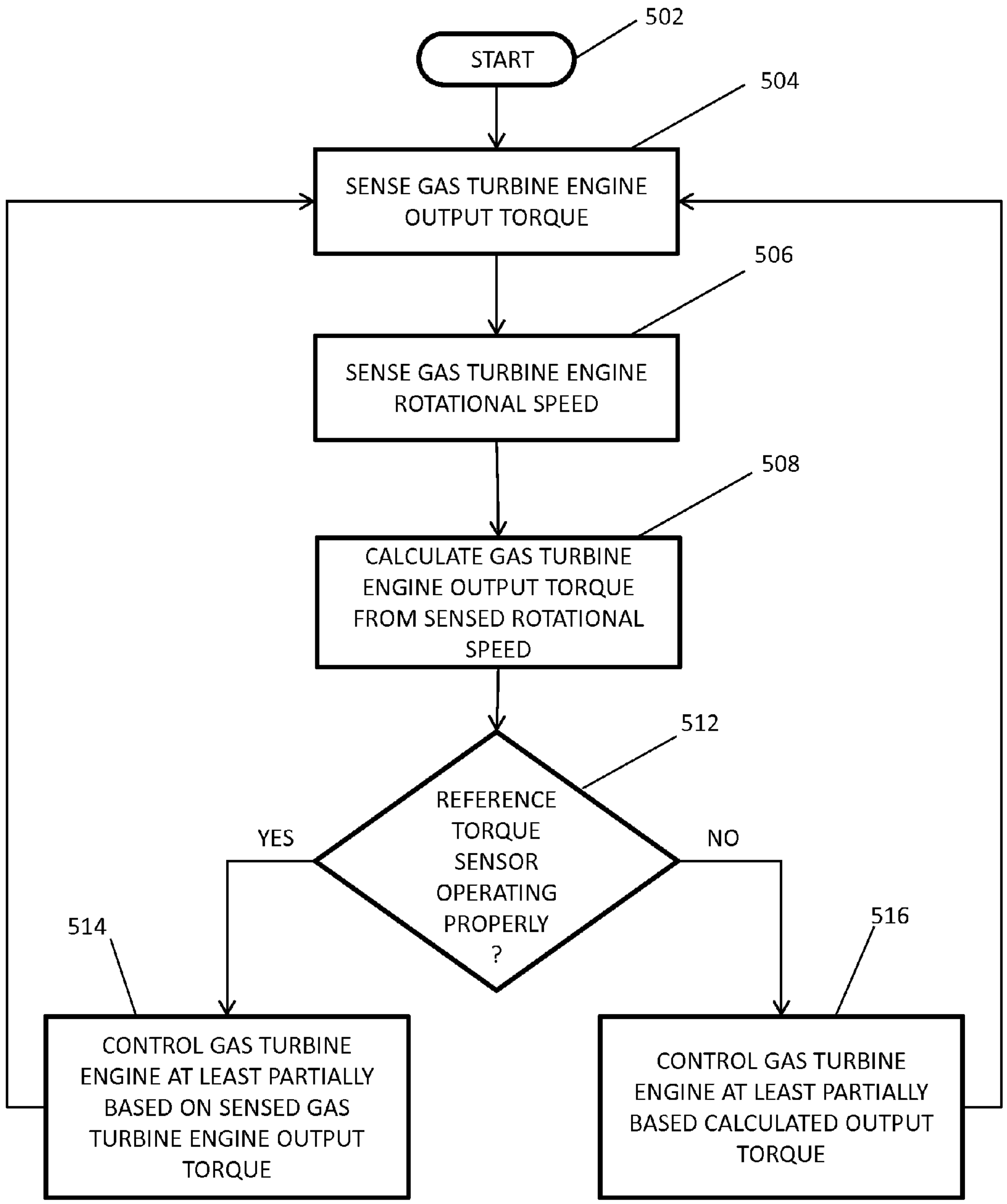
FIG. 5 depicts a method, in flowchart form, of an exemplary method that may be implemented in the system of FIG. 1.

With the above in mind, and with reference to FIG. 5, the engine control 104 receives the torque sensor signal (504) and the speed sensor signal (506). The engine control 104 calculates the output torque of the engine 102 from the sensed rotational speed of the output shaft 114 (508). The engine control 104 then compares the sensed output torque to the calculated output torque to determine if the reference torque sensor 116 is operating properly (512). In a particular embodiment, the engine control 104 makes this determination by comparing the sensed and calculated output torques to determine if the two values differ by a predetermined magnitude. If the two values do not differ by the predetermined magnitude, then the engine control 104 controls the gas turbine engine 102 at least partially based on the sensed output torque (514). That is, the sensed output torque is used in the one or more control laws. Conversely, if the two values differ by the predetermined magnitude, then the engine control 104 controls the gas turbine engine 102 at least partially based on the calculated output torque (516). That is, the calculated output torque is used in the one or more control laws.

As FIG. 1 additionally depicts, the engine control 104 may also implement an engine model 122. The engine model 122 is preferably a software model of the gas turbine engine 102. The engine model 122, based on the plurality of sensed parameters in the gas turbine engine 102, may, among other things, determine the output torque of the gas turbine engine 102. This output torque, which is referred to herein as a model-based output torque, may also be compared to the sensed output torque and/or the calculated output torque. In some embodiments, the one or more control laws may use the model-based engine torque if both the reference torque sensor 116 and the speed sensor 118 are determined to be inoperable. Moreover, in some embodiments the model-based engine torque may be used to improve the accuracy of the sensed output torque and/or the calculated output torque.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine control system, comprising:

a gas turbine engine including an output shaft, the gas turbine engine adapted to receive fuel flow and, upon receipt thereof, to generate an output torque and supply the output torque via the output shaft;

a reference torque sensor operable to sense the output torque and supply a torque sensor signal representative thereof;

a speed sensor operable to sense a rotational speed of the gas turbine engine and supply a speed sensor signal representative thereof; and an engine control operable to implement one or more control laws, based in part on the output torque and rotational speed of the gas turbine engine, the engine control coupled to receive the torque sensor signal and the speed sensor signal and further operable to:

(i) calculate the output torque from the sensed rotational speed of the gas turbine engine, (ii) compare the sensed output torque to the calculated output torque to determine if the reference torque sensor is operating properly, (iii) use the sensed output torque in the one or more control laws if the reference torque sensor is determined to be operating properly, and (iv) use the calculated output torque in the one or more control laws if the reference torque sensor is determined to be not operating properly.

2. The system of claim 1, wherein the engine control determines that the reference torque sensor is not operating properly if the sensed output torque and the calculated output torque differ by a predetermined magnitude.

3. The system of claim 1, wherein:

the engine control implements a software model of the gas turbine engine, the software model configured to determine a model-based output torque; and the engine control is further operable to compare the sensed output torque and the calculated output torque to the model-based output torque.

4. The system of claim 1, wherein the reference torque sensor comprises:

a torque shaft disposed within, and at least partially surrounded by, the output shaft, the torque shaft having a fixed end and a free end, the fixed end coupled to the output shaft, whereby the torque shaft is rotated by the output shaft; and a sensor configured to sense rotations of the torque shaft and the output shaft and supply a signal representative thereof as the torque sensor signal.

5. The system of claim 4, wherein:

the torque sensor signal is representative of a relative rotational displacement of at least the torque shaft free end and the output shaft; and the engine control is further operable to determine the output torque from the torque sensor signal.

6. The system of claim 4, wherein:

the torque shaft and the output shaft each comprise a plurality of evenly spaced protrusions; and the sensor comprises a pick-up device configured to generate and supply an output voltage having an amplitude that varies based on a proximity thereto of each protrusion.

7. The system of claim 6, wherein the pick-up device is selected from a group consisting of a monopole pick-up, an eddy current sensor, and a Hall-effect sensor.

8. The system of claim 1, wherein the engine control is operable to:

differentiate the speed sensor signal to determine acceleration; and multiply the acceleration by a predetermined inertia value to calculate the output torque.

9. The system of claim 8, wherein the predetermined inertia value is gas turbine engine inertia that is stored within the engine control.

10. The system of claim 8, wherein the engine control is further operable to filter the speed sensor signal prior to differentiation thereof.

11. The system of claim 1, wherein the speed sensor is senses rotational speed of the output shaft.

12. An engine controller, comprising:

a processor adapted to receive a torque sensor signal from a reference torque sensor and a speed sensor signal from a speed sensor, the torque sensor signal representative of a sensed engine output torque, the speed sensor signal representative of a sensed engine rotational speed, the processor configured to implement one or more engine control laws, based in part on engine output torque and engine rotational speed, the engine control operable to:

(i) calculate engine output torque from the sensed engine output shaft rotational speed, (ii) compare the sensed engine output torque to the calculated engine output torque to determine if the reference torque sensor is operating properly, (iii) use the sensed output torque in the one or more control laws if the reference torque sensor is determined to be operating properly, and (iv) use the calculated engine output torque in the one or more control laws if the reference torque sensor is determined to be not operating properly.

13. The engine controller of claim 12, wherein the processor determines that the reference torque sensor is not operating properly if the sensed output torque and the calculated output torque differ by a predetermined magnitude.

14. The engine controller of claim 12, wherein the engine control is operable to:

differentiate the speed sensor signal to determine acceleration; and multiply the acceleration by a predetermined inertia value to calculate the output torque.

15. The engine controller of claim 14, wherein the predetermined inertia value is gas turbine engine inertia that is stored within the engine control.

16. The engine controller of claim 14, wherein the engine control is further operable to filter the speed sensor signal prior to differentiation thereof.

17. A method for a gas turbine engine, comprising the steps of:

sensing gas turbine engine output torque using a reference torque sensor;

sensing gas turbine engine rotational speed;

calculating gas turbine engine output torque from the sensed gas turbine engine rotational speed;

comparing the sensed gas turbine engine output torque to the calculated gas turbine engine output torque to determine if the reference torque sensor is operating properly;

controlling the gas turbine engine at least partially based on the sensed gas turbine engine output torque if the reference torque sensor is determined to be operating properly; and controlling the gas turbine engine at least partially based on the calculated output torque if the reference torque sensor is determined to be not operating properly.

18. The method of claim 17, wherein the step of comparing comprises:

determining if the sensed gas turbine engine output torque and the calculated gas turbine engine output torque differ by a predetermined magnitude.

19. The method of claim 17, further comprising:

differentiating the sensed gas turbine engine rotational speed to determine gas turbine engine acceleration; and multiplying gas turbine engine acceleration by a predetermined inertia value to calculate the gas turbine engine output torque.

20. The method of claim 17, further comprising:

determining a model-based gas turbine engine output torque using a software model of the gas turbine engine; and comparing the sensed gas turbine engine output torque and the calculated gas turbine engine output torque to the model-based gas turbine engine output torque.

* * * * *